US012681735B2

(12) United States Patent
Liang

(10) Patent No.: US 12,681,735 B2
(45) Date of Patent: Jul. 14, 2026

(54) APPLICATION PROGRAM STARTUP METHOD AND ELECTRONIC DEVICE

(71) Applicant: ZTE Corporation, Shenzhen (CN)

(72) Inventor: Zhen Liang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 187 days.

(21) Appl. No.: 18/689,665

(22) PCT Filed: Jun. 6, 2022

(86) PCT No.: PCT/CN2022/097195
§ 371 (c)(1),
(2) Date: Mar. 6, 2024

(87) PCT Pub. No.: WO2023/035699
PCT Pub. Date: Mar. 16, 2023

(65) Prior Publication Data
US 2025/0123853 A1     Apr. 17, 2025

(30) Foreign Application Priority Data

Sep. 9, 2021     (CN) .......................... 202111058073.2

(51) Int. Cl.
*G06F 9/445*          (2018.01)
*G06F 3/04817*        (2022.01)
          (Continued)

(52) U.S. Cl.
CPC .......... *G06F 9/445* (2013.01); *G06F 3/04817* (2013.01); *G06F 3/0482* (2013.01);
          (Continued)

(58) Field of Classification Search
CPC .... G06F 9/445; G06F 3/04817; G06F 3/0484; G06F 21/32; G06F 21/36; G06F 3/0488;
          (Continued)

(56) References Cited

U.S. PATENT DOCUMENTS 11,381,676 B2 *    7/2022    Arellano ............... G06F 3/0488
2008/0126966 A1    5/2008    Grossman
          (Continued)

FOREIGN PATENT DOCUMENTS

CN          103425423 A       12/2013
CN          104077032 A       10/2014
          (Continued)

OTHER PUBLICATIONS

WO2020151518A1 Machine Translation, Clarivate Analytics, Jul. 30, 2020 (Year: 2020).*
          (Continued)

*Primary Examiner* — Nicholas Ulrich
(74) *Attorney, Agent, or Firm* — CANTOR COLBURN LLP

(57) ABSTRACT

An application program startup method and an electronic device are provided. The method includes: acquiring an application display instruction, wherein the application display instruction is an instruction generated in responsive to activation of an application selection entry by an external object; controlling, according to the application display instruction, a display apparatus of an electronic device to display one or more application icons; acquiring an application selection instruction, wherein the application selection instruction indicates that a corresponding application icon is selected; and in a case where identity verification is passed, executing an unlocking operation and starting an application program corresponding to the selected application icon.

18 Claims, 4 Drawing Sheets

(51) Int. Cl.

| | |
|---|---|
| *G06F 3/0482* | (2013.01) |
| *G06F 3/0484* | (2022.01) |
| *G06F 3/0488* | (2022.01) |
| *G06F 21/32* | (2013.01) |
| *G06F 21/36* | (2013.01) |
| *H04M 1/72463* | (2021.01) |
| *H04M 1/72472* | (2021.01) |

(52) U.S. Cl.
CPC ............ *G06F 3/0484* (2013.01); *G06F 21/32* (2013.01); *G06F 21/36* (2013.01); *H04M 1/724631* (2022.02); *H04M 1/72472* (2021.01); *G06F 3/0488* (2013.01)

(58) Field of Classification Search
CPC .. G06F 9/44; G06F 3/0482; H04M 1/724631; H04M 1/724634; H04M 1/72472
See application file for complete search history.

(56) References Cited

U.S. PATENT DOCUMENTS

| | | | | |
|---|---|---|---|---|
| 2010/0269040 | A1* | 10/2010 | Lee ...................... | G06F 3/0486 |
| | | | | 715/702 |
| 2013/0067376 | A1* | 3/2013 | Kim ...................... | G06F 3/0488 |
| | | | | 715/769 |
| 2013/0285925 | A1* | 10/2013 | Stokes ................... | H04M 1/67 |
| | | | | 345/173 |
| 2013/0318475 | A1* | 11/2013 | Xie ...................... | G06F 3/0482 |
| | | | | 715/823 |
| 2014/0137049 | A1* | 5/2014 | Jung ..................... | G06F 21/36 |
| | | | | 715/847 |
| 2014/0298268 | A1* | 10/2014 | Kang .................. | G06F 3/04847 |
| | | | | 715/841 |
| 2016/0070437 | A1* | 3/2016 | Chiang ............. | H04M 1/72472 |
| | | | | 715/846 |
| 2016/0092018 | A1* | 3/2016 | Lee ....................... | G06F 1/1684 |
| | | | | 345/173 |
| 2017/0109011 | A1 | 4/2017 | Jiang | |
| 2018/0035296 | A1 | 2/2018 | Wu | |
| 2018/0321797 | A1* | 11/2018 | Liu ......................... | G06F 9/445 |
| 2020/0125708 | A1* | 4/2020 | Jeon ...................... | G06V 40/63 |
| 2021/0152685 | A1* | 5/2021 | Li ......................... | G06F 3/0484 |

FOREIGN PATENT DOCUMENTS

| | | | | |
|---|---|---|---|---|
| CN | 104850433 A | 8/2015 | | |
| CN | 105446597 A | 3/2016 | | |
| CN | 109726539 A | 5/2019 | | |
| CN | 110554815 A | 12/2019 | | |
| JP | 2019109825 A | 7/2019 | | |
| JP | 2021043993 A | 3/2021 | | |
| WO | WO-2020088167 A1 * | 5/2020 | ............ | G06F 9/445 |
| WO | 2020151518 A1 | 7/2020 | | |
| WO | WO-2021169959 A1 * | 9/2021 | ......... | G06F 3/04817 |

OTHER PUBLICATIONS

WO2021169959A1 Machine Translation, Clarivate Analytics, Sep. 2, 2021 (Year: 2021).*

1 European Search Report for corresponding application EP22866175; Mail date Nov. 5, 2024.

Japanese Office Action; Application No. 2024513354; date of mailing: Dec. 26, 2024 11 pages.

Korean Office Action; Application No. 10-2024-7002455; Filing Date: Jan. 22, 2024; date of mailing: Jan. 15, 2026; 14 pages.

International Search Report for corresponding application PCT/CN2022/097195 filed Jun. 6, 2022; Mail date Aug. 23, 2022.

* cited by examiner

Fig. 7

APPLICATION PROGRAM STARTUP METHOD AND ELECTRONIC DEVICE

CROSS-REFERENCE TO RELATED APPLICATION

This disclosure is a National Stage Filing of the PCT International Application No. PCT/CN2022/097195 filed on Jun. 6, 2022, which claims priority to Chinese Patent Application No. CN 202111058073.2, filed on Sep. 9, 2021, entitled "APPLICATION PROGRAM STARTUP METHOD AND ELECTRONIC DEVICE", which is incorporated herein by reference in its entirety.

TECHNICAL FIELD

The present disclosure relates to the field of human-machine interaction technologies, and in particular, to an application program startup method and electronic device.

BACKGROUND

With the advancement of technologies and improvement of intelligence automation, intelligent terminals (such as mobile phones, tablet computers, and smart bracelets) are becoming simpler and lighter to carry: With the ever increasing demand of people for terminal applications, application programs (also referred to as applications) running on terminals are increasing. Generally, when a user wants to start an application, the user needs to unlock the terminal, and then finds and taps on an icon corresponding to the application in the terminal, so as to start the application.

However, when there are a large number of application programs on the terminal, a user needs to spend a lot of time to search for the corresponding application program after completing identity verification, which means that many operation steps are required for starting the application program, and this seriously affects the use experience.

SUMMARY

In view of the above, the embodiments of the present disclosure provide an application program startup method and electronic device, which may solve the problem that user experience is affected due to a large number of operation steps required when the user wants to start an application program on a terminal.

The embodiments of the present disclosure provide an application program startup method, including: acquiring an application display instruction, wherein the application display instruction is an instruction generated in responsive to activation of an application selection entry by an external object; controlling, according to the application display instruction, a display apparatus of an electronic device to display one or more application icons; acquiring an application selection instruction, wherein the application selection instruction indicates that a corresponding application icon is selected; and in a case where identity verification is passed, executing an unlocking operation and starting an application program corresponding to the selected application icon.

The embodiments of the present disclosure provide an electronic device including a memory and a processor, wherein the memory stores at least one instruction, and the at least one instruction is loaded and executed by the processor to implement the application program startup method provided in the embodiments of the present disclosure.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person having ordinary skill in the art may still derive other drawings from these accompanying drawings without creative efforts.

FIG. 7 is a schematic diagram of a scenario of identity verification according to the embodiments of the present disclosure.

DETAILED DESCRIPTION

The following clearly and completely describes the technical solutions in the embodiments of the present disclosure with reference to the accompanying drawings in the embodiments of the present disclosure. Apparently, the embodiments to be described are merely a part rather than all of the embodiments of the present disclosure. All other embodiments acquired by a person having ordinary skill in the art based on the embodiments of the present disclosure without creative efforts shall belong to the scope of protection of the present disclosure.

The flowchart shown in the figure is merely illustrative, does not necessarily include all of the content and operations/steps, nor do the operations/steps necessarily have to be performed in the shown order. For example, some operations/steps may be broken down, combined, or partially combined, and thus the order of actual execution may vary as desired.

The terminology used in the description of the present disclosure herein is for the purpose of describing exemplary embodiments only and is not intended to limit the disclosure. As used in this description and the appended claims, the singular forms "a", "an", and "the" are intended to include the plural forms as well, unless the context clearly indicates otherwise.

Some embodiments of the present disclosure will be described in detail below with reference to the accompanying drawings. Without conflict, the following embodiments and features in the embodiments may be combined with each other.

Figure 1:
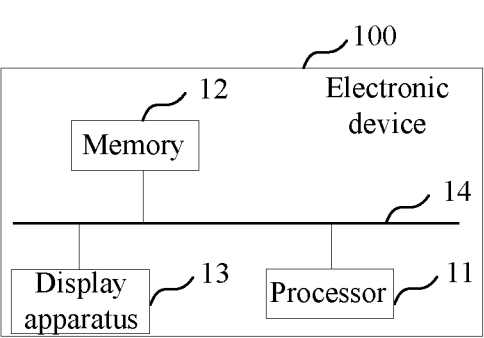
FIG. 1 is a schematic structural block diagram of an electronic device according to the embodiments of the present disclosure.

Please refer to FIG. 1, an electronic device 100 in the embodiments of the present disclosure may include one or more of the following components: a processor 11, a memory 12, and a display apparatus 13, where the processor 11, the memory 12, and the display apparatus 13 are connected via a bus 14, and the bus is, for example, an Inter-integrated Circuit (I2C) bus. The memory 12 stores at least one instruction, where the instruction is loaded and executed by the processor 11 to implement the application program startup method described in the following embodiments. The electronic device 100 may be a smart phone, a tablet computer, a notebook computer, a smart bracelet, or the like.

The processor 11 may include one or more processing cores. The processor 11 is connected to each part in the whole terminal (electronic device) 100 via various interfaces and lines, and executes various functions of the terminal (electronic device) 100 and processes data by running or executing an instruction, a program, a code set or an instruction set stored in the memory 12 and by invoking data stored in the memory 12. The processor 11 may be integrated with one or a combination of several of a Central Processing Unit (CPU), a Graphics Processing Unit (GPU), a modem, and the like. The CPU mainly processes an operating system, an external object interface, an application program, etc.; the GPU is responsible for rendering and graphing of content required to be displayed by the display apparatus 13; and the modem is used to process wireless communications. The modem may alternatively be implemented by a separate chip instead of being integrated into the processor 11.

The memory 12 may include a Random Access Memory (RAM), and may also include a Read-Only Memory (ROM). In an implementation, the memory 12 includes a non-transitory computer-readable storage medium. The memory 12 may be used to store instructions, programs, code, sets of code, or sets of instructions. The memory 12 may include a program storage area and a data storage area, wherein the program storage area may store instructions for implementing an operating system, instructions for implementing at least one function (such as a touch control function, a voice playing function and an image playing function), instructions for implementing the following method embodiments, etc.; and the data storage area may store data (such as audio data, phonebook) created during the use of the terminal 100, and the like.

The display apparatus 13 serves to provide a corresponding visual output and to receive a touch operation of an external object on or near the display apparatus 13 using any suitable object, such as a finger, a stylus or the like.

In an implementation, the display apparatus 13 may detect touch information corresponding to a touch operation of an external object, such as a direction, a duration, and a pressure value, and transmit the corresponding touch information to the processor 11. The processor 11 determines a corresponding touch event according to the received touch information, so as to control the display apparatus 13 to provide a corresponding visual output according to the touch event.

For example, the display apparatus 13 may be a touch display screen, and the display screen may be a capacitive display screen or a resistive display screen, which is not limited in the present disclosure.

A person having ordinary skill in the art may understand that the structure shown in FIG. 1 is only a partial block structure related to the solutions of the embodiments of the present disclosure, and does not limit the electronic device to which the solutions of the embodiments of the present disclosure can be applied. A specific electronic device may include more or fewer components, or combine some components, or have different component arrangements than those shown in the figure.

The memory 12 stores at least one computer-executable instruction, and the processor 11 executes the computer-executable instruction to implement the following functions: acquiring an application display instruction, wherein the application display instruction is an instruction generated in responsive to activation of an application selection entry by an external object; controlling, according to the application display instruction, a display apparatus of an electronic device to display one or more application icons; acquiring an application selection instruction, wherein the application selection instruction indicates that a corresponding application icon is selected; and in a case where identity verification is passed, executing an unlocking operation and starting an application program corresponding to the selected application icon.

In some implementations, the processor 11, when controlling, according to the application display instruction, the display apparatus of the electronic device to display the one or more application icons, is configured to execute the following operations: acquiring, according to the application display instruction, multiple application icons which are preset, and determining a usage frequency of an application program corresponding to each of the multiple application icons; determining an arrangement order of the multiple application icons according to the usage frequency; and controlling the display apparatus to display the multiple application icons according to the arrangement order.

In some embodiments, each of the one or more application icons is displayed on periphery of an identity verification entry, wherein the identity verification entry, after being continuously triggered by the external object for a preset period of time, generates the application selection instruction.

In some embodiments, the processor 11, before controlling the display apparatus to display the multiple application icons according to the arrangement order, is further configured to execute the following operations: acquiring a preset default application icon, and displaying the default application icon on at least one of a position where the application selection entry is located and a position where the identity verification entry is located, wherein the default application icon is an application icon corresponding to an application program with highest usage frequency or an application icon set by an external object.

In some embodiments, the application selection instruction is an instruction generated after the electronic device detects that the application icon is continuously triggered by the external object for a preset period of time and detects that the external object triggers the identity verification entry.

In some embodiments, the processor 11 is further configured to execute the following operations: controlling, after detecting that the application icon is continuously triggered by the external object for the preset period of time, the display apparatus to display the triggered application icon at a position where the identity verification entry is located.

In some embodiments, the application selection entry is displayed in a first display region of the display apparatus, and the identity verification entry is displayed in a second display region of the display apparatus, wherein a position of the first display region is different from a position of the second display region (e.g., they do not overlap with each other).

In some embodiments, the processor 11 is configured to perform the identity verification in a following manner: acquiring fingerprint information of the external object via a fingerprint collection entry; and performing the identity verification according to the fingerprint information.

In some embodiments, the processor 11 is configured to perform the identity verification in a following manner: controlling the display apparatus to display identity verification information; acquiring verification information provided in response to the identity verification information; and performing the identity verification according to the verification information.

The details and extensions of the functions implemented by the processor 11 via executing computer-executable instructions are described below.

Figure 2:
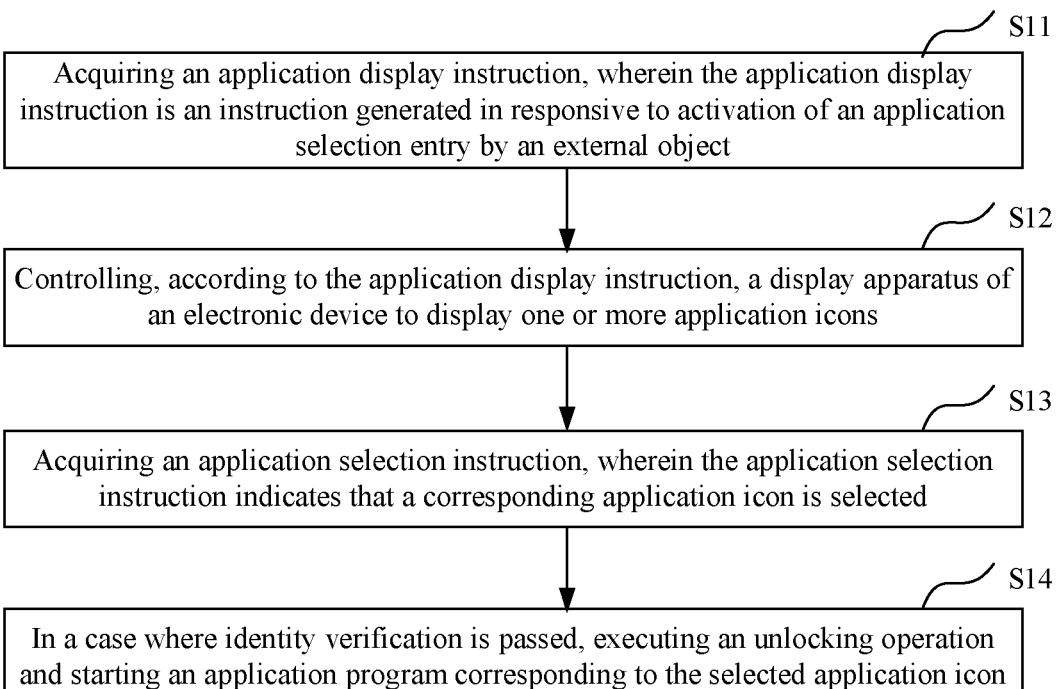
FIG. 2 is a flowchart of an application program startup method according to the embodiments of the present disclosure.

Please refer to FIG. 2, FIG. 2 is a flowchart of an application program startup method according to the embodiments of the present disclosure, which is applied to an electronic device. The application program startup method may include operation S11 to operation S14.

At operation S11, an application display instruction is acquired, wherein the application display instruction is an instruction generated in responsive to activation of an application selection entry by an external object.

Exemplarily, when receiving a screen wake-up instruction, the electronic device 100 may enter a screen-locked state, and display a relevant widget in the screen-locked state. The screen wake-up instruction may be generated when a power button of the electronic device 100 is pressed when a screen of the electronic device 100 is not turned on, may alternatively be generated when the display apparatus of the electronic device 100 is double-clicked when the screen of the electronic device 100 is not turned on, may alternatively be generated when the electronic device 100 receives preset voice information, and may alternatively be generated when the electronic device 100 is connected to a charger.

Figure 3:
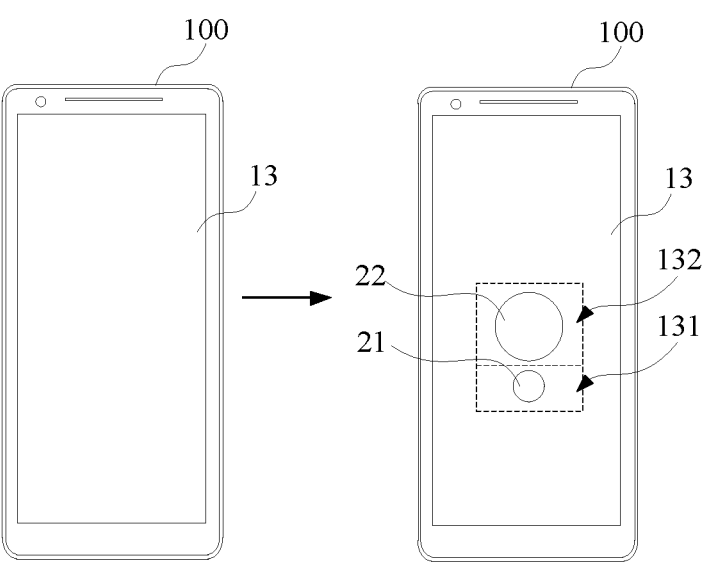
FIG. 3 is a schematic diagram of a scenario where an electronic device enters a screen-locked state according to the embodiments of the present disclosure.

Please refer to FIG. 3, when the electronic device 100 is in a screen-locked state, the display apparatus 13 is provided with (e.g., displays) the application selection entry 21. The appearance, size and arrangement manner of the position where the application selection entry 21 is located may be selected according to specific use conditions, and are not limited in the embodiments of the present disclosure. When the electronic device 100 is in the screen-locked state, the display apparatus 13 may further display information such as the current time, and the remaining electricity quantity and the network condition of the electronic device 100, which is not limited in the embodiments of the present disclosure.

After the application selection entry 21 is activated by the external object, the corresponding application display instruction is generated, so that the display apparatus 13 displays one or more corresponding application icons. In some exemplary implementations, when the electronic device 100 detects that the external object continuously triggers a position where the application selection entry 21 is located for a preset period of time, it indicates that the application selection entry 21 is activated. Alternatively, when the electronic device 100 receives a preset gesture of the external object, it indicates that the application selection entry 21 is activated. The embodiments of the present disclosure do not limit the specific condition of activating the application selection entry 21. In the embodiments of the present disclosure, when the display apparatus 13 detects that the external object such as a finger or a touch pen contacts a corresponding position, it indicates that the position is triggered. A duration of the contact operation may be limited, for example, when the display apparatus 13 detects that the external object contacts the corresponding position for more than a preset period of time, it indicates that the position is triggered.

At operation S12, a display apparatus of an electronic device is controlled, according to the application display instruction, to display one or more application icons.

Figure 4:
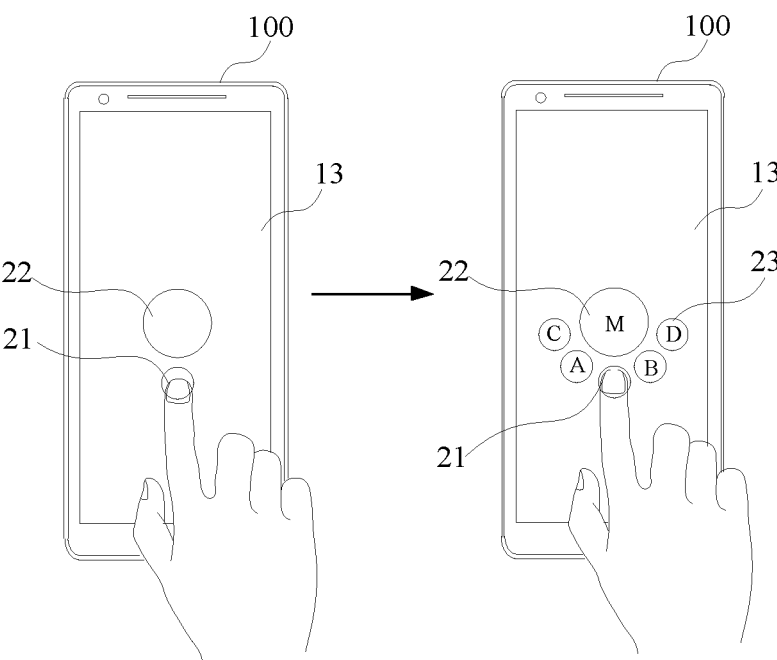
FIG. 4 is a schematic diagram of a scenario where an electronic device enters an application icon display state according to the embodiments of the present disclosure.

Please refer to FIG. 4, after the position of the application selection entry 21 is triggered, the display apparatus 13 displays one or more corresponding application icons 23.

The embodiments of the present disclosure do not limit the number, the icon size and the arrangement manner, etc., of the one or more application icons 23. For example, the display number or arrangement manner of the one or more application icons 23 is not fixed, and the display number or arrangement manner of the one or more application icons 23 may be determined in advance according to a current running condition of the electronic device 100 or according to the setting of the display number or arrangement manner of the one or more application icons 23 provided by the external object. For example, at 7:00 a.m., the electronic device 100 displays two application icons 23 arranged linearly after the application selection entry 21 is triggered; and at 20:00 p.m., the electronic device 100 displays six application icons 23 arranged in a curve after the application selection entry 21 is triggered.

In some embodiments, the operation of controlling, according to the application display instruction, the display apparatus of the electronic device to display the one or more application icons includes: acquiring, according to the application display instruction, multiple application icons which are preset, and determining a usage frequency of an application program corresponding to each of the multiple application icons; determining an arrangement order of the multiple application icons according to the usage frequency; and controlling the display apparatus to display the multiple application icons according to the arrangement order.

The selection range of the one or more application icons 23 may include respective icons corresponding to various applications installed on the electronic device, for example, "application A", "application B", and "application C". The selection range of the one or more application icons 23 may alternatively or additionally include an icon corresponding to any other function installed on the electronic device, for example, "bus card", "access card", and "identity card" simulated by Near Field Communication (NFC).

The one or more application icons 23 may be determined according to historical usage records of the application programs. When the electronic device 100 receives the application display instruction, a preset number of application icons 23 are determined according to the historical usage record. For example, the one or more application icons 23 may be determined according to the usage time or the number of times of usage of each application program of the electronic device 100 within a preset period of time, and an icon corresponding to an application program of which the usage time or the number of times of usage is greater than a threshold value is taken as the application icon 23.

The one or more application icons 23 may alternatively be determined according to selection of the external object. The external object may set, according to his/her preference, an icon corresponding to a corresponding application program as the application icon 23, for example, the external object may set icons corresponding to a "bus card" and an "access card" as the application icons 23.

After the one or more application icons 23 are acquired, the usage frequency of the application program corresponding to each application icon 23 is determined. Exemplarily, the usage time of the application program corresponding to each application icon 23 within a preset period of time may be calculated, and a ratio of the usage time corresponding to each application icon 23 to the sum of the usage time corresponding to all application icons 23 may be calculated to acquire the usage frequency of the application program corresponding to each application icon 23. Alternatively, the number of times of using the application program corresponding to each application icon 23 within a preset period of time may be acquired, and a ratio of the number of times of using each application icon 23 to the sum of the number of times of using all the application icons 23 may be calculated, so as to acquire the usage frequency of the application program corresponding to each application icon 23.

The arrangement order of the application icons 23 is determined according to the usage frequency corresponding to each application icon 23, and then the display apparatus is controlled to display the application icons 23 according to the arrangement order.

For example, the application icons 23 may be displayed in a linear arrangement according to the usage frequency corresponding to each application icon 23, wherein the arrangement order is acquired by arranging an application icon with a higher usage frequency in the middle position, and arranging an application with a lower usage frequency in the edge position. Then, the display apparatus is controlled to display the application icons 23 according to the arrangement order.

As shown in FIG. 4, in some embodiments, each of the one or more application icons 23 is displayed on periphery of an identity verification entry 22, wherein the identity verification entry 22, after being continuously triggered by the external object for a preset period of time, generates the application selection instruction. The appearance, size and arrangement of the identity verification entry 22 may be selected according to the specific usage, and are not limited in the embodiments of the present disclosure.

In some embodiments, the application selection entry 21 is displayed in a first display region 131 of the display apparatus 13, and the identity verification entry 22 is displayed in a second display region 132 of the display apparatus 13, wherein a position of the first display region 131 and a position of the second display region 132 do not overlap with each other. For example, as shown in FIG. 3, the first display region 131 is adjacent to the second display region 132, i.e., the application selection entry 21 is adjacent to the identity verification entry 22, so as to reduce the operation range of the external object when performing a corresponding touch operation, thereby improving the use experience. The arrangement manner and the size of the first display region 131 and the second display region 132 may be selected according to specific situations, and are not limited in the embodiments of the present disclosure.

The periphery of the identity verification entry 22 refers to a range within a preset distance from the identity verification entry 22. By displaying the one or more application icons 23 on the periphery of the identity verification entry 22, a moving distance of any suitable object such as a finger or a touch pen when the external object performs a selection operation may be reduced, so that the external object can quickly select the corresponding application icon 23.

Exemplarily, all application icons 23 are sorted according to a usage frequency, so as to determine a distance between each application icon 23 and the identity verification entry 22 according to a sorting result. When the display apparatus displays the corresponding application icons 23 on the periphery of the identity verification entry 22, the arrangement order of the application icons 23 on the periphery of the identity verification entry 22 is determined according to the distance.

For example, the higher the usage frequency of the application icon 23 is, the shorter the distance between the application icon 23 and the preset location is. As shown in FIG. 4, the application icons 23 include an icon A, an icon B, an icon C and an icon D, and according to the usage frequency, a corresponding descending order of the usage frequency of the application icons 23 is determined as: the icon A, the icon B, the icon C and the icon D. The arrangement positions of the application icons 23 on the display apparatus 13 include a position A, a position B, a position C and a position D, in which the distance between the position A and the application selection entry 21 and the distance between the position B and the identity verification entry 22 are both 0.1 mm, the distance between the position C and the application selection entry 21 and the distance between the position D and the application selection entry 21 are both 1.1 mm, and the distance between the position C and the identity verification entry 22 and the distance between the position D and the identity verification entry 22 are both 0.1 mm. Therefore, the arrangement order (ascending order) of the positions may be determined according to the sum of the distances between each arrangement position and the application selection entry 21 and the identity verification entry 22 as: the position A, the position B, the position C and the position D. According to the sorting result of the arrangement positions and the sorting result of the application icons 23, the arrangement order is determined as follows: the icon A is displayed at the position A, the icon B is displayed at the position B, the icon C is displayed at the position B, and the icon D is displayed at the position D.

After the location of the application selection entry 21 is triggered, the application icons 23 with higher usage frequencies are arranged at locations closer to the identity verification entry 22 and the application selection entry 21, so that the external object can quickly select an application program corresponding to the most frequently used application icon 23, thereby improving the usage experience.

When the position where the application selection entry 21 is located is not triggered, the one or more corresponding application icons 23 are hidden. By displaying the one or more application icons 23 only when the position where the application selection entry 21 is located is triggered in the screen-locked state, the case where the application icon 23 is triggered by mistake, and then the corresponding application program is started by mistake is avoided, and when it is not necessary to use a quick start application program, the interface of the electronic device in the screen-locked state is more neat and beautiful, and the use experience of the external object is improved.

In some embodiments, before controlling the display apparatus to display the multiple application icons according to the arrangement order, the method further includes: acquiring a preset default application icon, and displaying the default application icon on at least one of a position where the application selection entry is located and a position where the identity verification entry is located, wherein the default application icon is an application icon corresponding to an application program with highest usage frequency or an application icon set by an external object.

The default application icon is included in the one or more application icons 23 and is used for representing a default currently selected application icon before the external object selects from the one or more application icons 23 displayed by the display apparatus 13.

The preset default application icon may be an application icon corresponding to an application program set by the external object as a default application icon according to the preference of the external object, for example, the external object may set an application icon corresponding to a "bus card" as the default application icon. Alternatively, the preset default application icon may be an application icon corresponding to an application program with highest usage frequency. Alternatively, the preset default application icon may be an application icon corresponding to an application program recently used by the external object.

As shown in FIG. 4, for example, after the external object triggers the position of the application selection entry 21, the display apparatus 13 displays the one or more corresponding application icons 23, and the preset default application icon M is displayed, by default, at the position of at least one of the application selection entry 21 and the identity verification entry 22.

By setting the default application icon, before the external object selects from the one or more application icons 23 displayed by the display apparatus 13, the electronic device 100 automatically selects a default application icon with a relatively high usage probability, so that when the external object needs to use an application program corresponding to the default application icon, operation steps of the external object are further reduced, thereby improving the usage experience of the external object.

At operation S13, an application selection instruction is acquired, wherein the application selection instruction indicates that a corresponding application icon is selected.

When the display apparatus 13 displays the one or more corresponding application icons 23, the electronic device 100 detects whether the application selection instruction is received, so as to determine the corresponding application icon 23 currently selected by the external object when the application selection instruction is received.

For example, when the display apparatus 13 displays the one or more corresponding application icons 23, the electronic device 100 detects a touch operation received via the display apparatus 13, so as to determine the selected application icon 23 according to the touch operation. In some exemplary implementations, after it is detected that a position of an application icon 23 is triggered for a preset period of time, it indicates that the application icon 23 is selected. Alternatively, when it is detected that a pressure received from a position where a certain application icon 23 is located is greater than a preset pressure value, it indicates that the application icon 23 is selected. Alternatively, when it is detected that a position of an application icon 23 is triggered for a preset period of time and a received pressure is greater than a preset pressure value, it indicates that the application icon 23 is selected.

In some implementations, the application selection instruction is an instruction generated after the electronic device detects that the application icon is continuously triggered by the external object for the preset period of time, and detects that the external object triggers the position of the identity verification entry.

Figure 5:
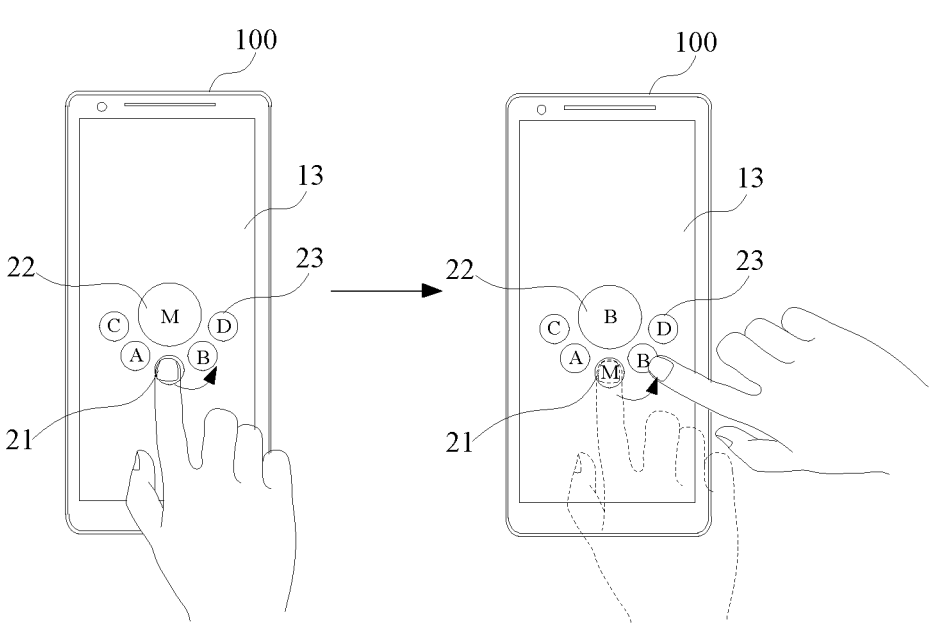
FIG. 5 is a schematic diagram of a scenario where an application icon is selected on an electronic device according to the embodiments of the present disclosure.

Please refer to FIG. 5, exemplarily, when the display apparatus 13 displays one or more corresponding application icons 23, the electronic device 100 detects a touch operation received by the display apparatus 13, and when it is detected that a position where a certain application icon 23 is located is triggered for a preset period of time, it indicates that the application icon 23 is currently selected by the external object.

In some embodiments, when it is detected that the application icon is continuously triggered by the external object for a preset period of time, the display apparatus is controlled to display the triggered application icon at the position where the identity verification entry is located.

As shown in FIG. 5, for example, after the finger of the external object slides from the application selection entry 21 into the display region of the application icon B and stays at the display region of the application icon B for a preset period of time, the display apparatus 13 displays the application icon B in the identity verification entry 22, and further represents to the external object that the application icon B is currently selected.

Figure 6:
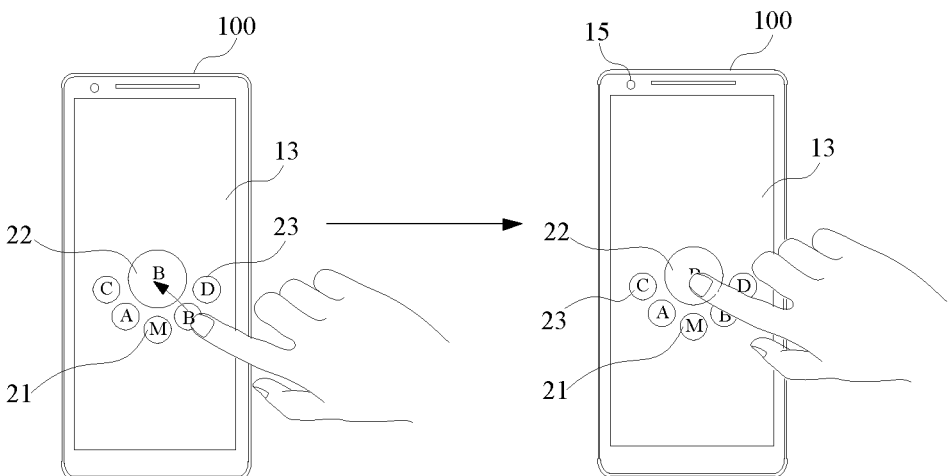
FIG. 6 is a schematic diagram of a scenario where an application icon is selected by an external object according to the embodiments of the present disclosure.

Please refer to FIG. 6, after the corresponding application icon 23 is selected by the external object, the electronic device 100 detects whether the touch operation of the external object has moved to the display region of the identity verification entry 22. When the display region of the identity verification entry 22 is triggered for a preset period of time, it indicates that the external object has selected the application icon 23, and then the application selection instruction corresponding to the application icon 23 is generated.

By detecting whether the identity verification entry 22 is triggered, further determining whether the external object completes the selection of the application icon 23, and then performing an identity verification operation on the external object, the steps of selecting the corresponding application icon 23 by the external object can be reduced, and the use experience can be improved.

When the electronic device 100 is in the screen-locked state, the electronic device 100 may directly perform identity verification on the external object, so as to directly display the corresponding default interface after the identity verification is passed. The default interface may be an interface displayed before the screen of the electronic device 100 is turned off, and may alternatively be a default main interface of the electronic device 100.

The operation of triggering the position of the application selection entry 21 by the external object to display the one or more corresponding application icons 23, the operation of triggering the position of an application icon 23 by the external object to perform selection, and the operation of triggering the identity verification entry 23 by the external object may be coherent operations or non-coherent operations, which is not limited in the embodiments of the present disclosure.

At operation S14, in a case where identity verification is passed, an unlocking operation is executed and an application program corresponding to the selected application icon is started.

In order to protect privacy of the external object and avoid leakage of information of the external object, a screen protection function needs to be provided in the electronic device 100, so that when the external object does not use the electronic device 100, the electronic device 100 is in a screen-locked state, and identity verification needs to be performed on the electronic device 100 so as to determine whether to unlock the electronic device 100 according to an identity verification result. The unlocking manner of the electronic device 100 may be password unlocking, pattern unlocking, fingerprint unlocking, voice unlocking, face unlocking, and the like. The unlocking manner of the electronic device 100 is not limited in the embodiments of the present disclosure.

When acquiring the application selection instruction, the electronic device 100 acquires identity verification information of the corresponding external object according to the application selection instruction, so as to perform identity verification according to the identity verification information.

In some embodiments, the identity verification is performed in a following manner: acquiring fingerprint information of the external object via a fingerprint collection entry; and performing the identity verification according to the fingerprint information.

In an embodiment, the electronic device 100 is provided with a fingerprint collection apparatus, and the fingerprint collection apparatus may be arranged on the display apparatus 13, for example, the fingerprint collection apparatus may be correspondingly arranged at the identity verification entry 22, i.e., the identity verification entry 22 is the fingerprint collection entry. The fingerprint collection apparatus may alternatively be provided separately from the display apparatus 13, for example, provided on a side adjacent to or opposite to the display apparatus 13, and the position where the fingerprint collection apparatus is located is a fingerprint collection entry. After the electronic device 100 acquires the application selection instruction or the fingerprint collection entry is triggered for a preset period of time, the fingerprint collection apparatus at the fingerprint collection entry acquires the fingerprint information of the external object.

The collected fingerprint information is matched with pre-recorded fingerprint information, and whether the degree of matching between the collected fingerprint information and the pre-recorded fingerprint information is greater than a threshold degree of matching is detected, and if the degree of matching is greater than the threshold degree of matching, it is determined that the identity verification is passed, and operation S14 is executed; if the degree of matching is not greater than the threshold degree of matching, it is determined that the identity verification fails.

In some embodiments, the identity verification is performed in the following manner: controlling the display apparatus to display identity verification information; acquiring verification information provided in response to the identity verification information; and performing the identity verification according to the verification information.

In an implementation, after the electronic device 100 receives the application selection instruction, the electronic device 100 controls the display apparatus 13 to display corresponding identity verification information.

Figure 7:
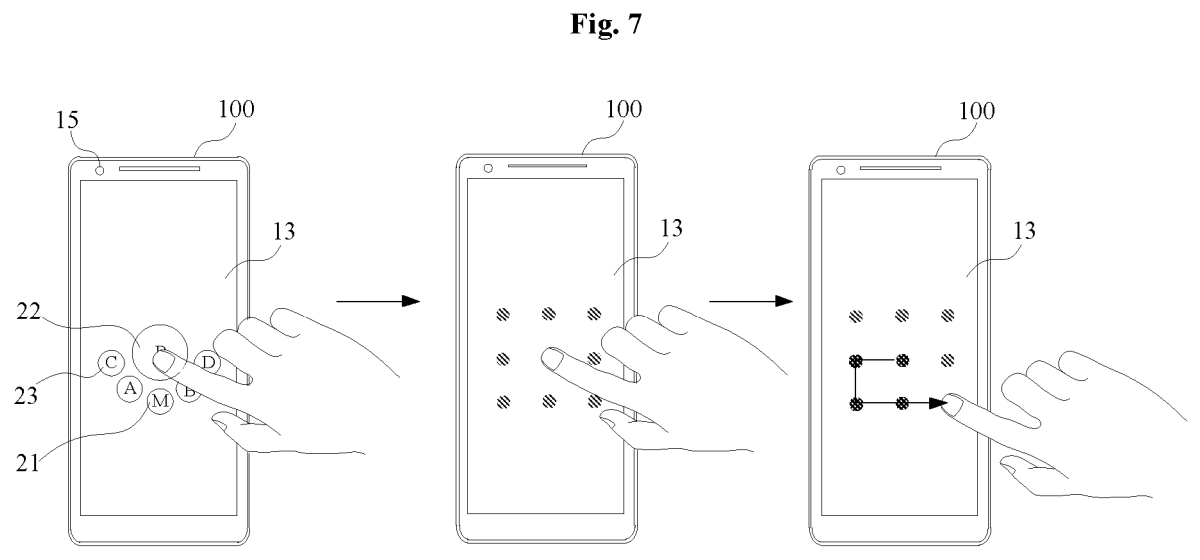

Please refer to FIG. 7, for example, when the electronic device 100 adopts pattern unlocking, the display apparatus 13 displays corresponding identity verification information, so as to display a corresponding pattern unlocking interface, and acquire an input track of the external object on the pattern unlocking interface. A starting point of a correct pattern corresponding to the pattern unlocking interface may coincide with an end point of a trigger operation of the external object when the application selection instruction is generated, so that the external object directly draws a pattern to perform unlocking on the pattern unlocking interface, thereby reducing a finger moving distance of the external object, and improving use experience. After the input track is acquired, the input track is compared with a preset track to acquire a corresponding matching degree, so as to determine, according to the corresponding matching degree, whether the input track is correct. When the matching degree is greater than a matching degree threshold value, it is determined that the identity verification is passed, and operation S14 is executed; if the matching degree is less than the matching degree threshold, it is determined that the identity verification fails.

For example, when the electronic device 100 adopts password unlocking, the display apparatus 13 may display the corresponding identity verification information to display a corresponding password unlocking interface, so as to acquire a digit sequence input by the external object on the password unlocking interface. The acquired digit sequence is compared with a preset digit sequence so as to judge whether the acquired digit sequence is consistent with the preset digit sequence, and if the acquired digit sequence is consistent with the preset digit sequence, it is determined that the identity verification is passed, and operation S14 is executed; if the acquired digit sequence is inconsistent with the preset digit sequence, it is determined that the identity verification fails.

For example, when the electronic device 100 adopts face-unlocking, the electronic device 100 is provided with an image collection apparatus 15. After the electronic device 100 receives the application selection instruction, the electronic device 100 controls the corresponding image collection apparatus 15 to acquire face information of the external object, so as to compare the acquired face information with preset face information to determine a corresponding matching degree, and further determine whether the acquired face information is correct according to the corresponding matching degree. When the matching degree is greater than a matching degree threshold value, it is determined that the identity verification is passed, and operation S14 is executed; when the matching degree is less than the matching degree threshold, it is determined that the identity verification fails.

When identity verification is passed, the electronic device 100, according to the application icon 23 selected by the external object, starts an application program corresponding to the selected application icon 23 while unlocking the electronic device 100, so as to display an interface of the selected application program after unlocking.

In some embodiments, if the identity verification is not passed, the electronic device 100 give a feedback in a predetermined manner, such as vibration feedback and information prompt, so as to prompt the external object to re-perform identity verification. When identity verification is re-performed, the application icon 23 previously selected by the external object may be retained, and identity information of the external object is directly acquired for authentication, so as to prevent the external object from performing a selection process of the application icon 23 again.

According to the embodiments of the present disclosure, an application display instruction is acquired, wherein the application display instruction is an instruction generated in responsive to activation of an application selection entry by an external object; a display apparatus of an electronic device is controlled, according to the application display instruction, to display one or more application icons; an application selection instruction is acquired, wherein the application selection instruction indicates that a corresponding application icon is selected; and in a case where identity verification is passed, an unlocking operation is executed and an application program corresponding to the selected application icon is started. The technical solution determines whether to display one or more application icons based on the detection concerning whether the application selection entry is activated, so that after the external object selects a displayed application icon, the identity verification entry is directly triggered to perform identity verification, and after the verification is passed, an application program corresponding to the application icon is started, thereby reducing the operation steps of performing identity verification and starting the application program corresponding to the application icon, and improving the usage experience of the external object.

The term "and/or" as used in this description and the appended claims refers to and includes combinations of any and all of one or more of the items listed. In this description, the terms "include", "comprise", and any variation thereof are intended to cover a non-exclusive inclusion, so that a process, a method, an article, or a system that includes a series of elements not only includes those elements, but also includes other elements not specified expressly, or further includes elements inherent to such process, method, article, or system. An element limited by "including a . . . " does not exclude that there are other same elements in the process, method, article, or system that includes the element, unless there are more limitations.

The serial numbers of the embodiments of the present disclosure are only for description, and do not represent the preference of the embodiments. The foregoing descriptions are merely exemplary embodiments of the present disclosure, but are not intended to limit the scope of protection of the present disclosure. Any equivalent modification or replacement readily obtained by a person having ordinary skill in the art within the technical scope disclosed in the present disclosure shall belong to the scope of protection of the present disclosure. Therefore, the scope of protection of the present disclosure shall be subject to the scope of protection of the claims.

What is claimed is:

1. An application program startup method, comprising:
acquiring an application display instruction, wherein the application display instruction is an instruction generated in responsive to activation of an application selection entry by an external object;
controlling, according to the application display instruction, a display apparatus of an electronic device to display one or more application icons, wherein controlling, according to the application display instruction, the display apparatus of the electronic device to display the one or more application icons comprises: acquiring, according to the application display instruction, multiple application icons which are preset, and determining a usage frequency of an application program corresponding to each of the multiple application icons; determining an arrangement order of the multiple application icons according to the usage frequency; and controlling the display apparatus to display the multiple application icons according to the arrangement order, wherein before controlling the display apparatus to display the multiple application icons according to the arrangement order, the method further comprises: acquiring a preset default application icon, and controlling the display apparatus to display the default application icon on at least one of a position where the application selection entry is located and a position where an identity verification entry is located, wherein the default application icon is an application icon corresponding to an application program with highest usage frequency, or an application icon corresponding to an application program recently used by the external object, or an application icon set by an external object;
acquiring an application selection instruction, wherein the application selection instruction indicates that a corresponding application icon is selected; and
in a case where identity verification is passed, executing an unlocking operation and starting an application program corresponding to the selected application icon.

2. The method according to claim 1, wherein each of the one or more application icons is displayed on periphery of an identity verification entry, wherein the identity verification entry, after being continuously triggered by the external object for a preset period of time, generates the application selection instruction.

3. The method according to claim 2, wherein the application selection entry is displayed in a first display region of the display apparatus, and the identity verification entry is displayed in a second display region of the display apparatus, wherein a position of the first display region and a position of the second display region do not overlap with each other.

4. The method according to claim 2, wherein the periphery of the identity verification entry refers to a range within a preset distance from the identity verification entry.

5. The method according to claim 2, wherein determining the arrangement order of the multiple application icons according to the usage frequency comprises:
sorting the multiple application icons according to the usage frequency, so as to determine a distance between each application icon and the identity verification entry according to a sorting result;
when the display apparatus displays the multiple application icons on the periphery of the identity verification entry, determining the arrangement order of the multiple application icons on the periphery of the identity verification entry according to the distance.

6. The method according to claim 5, wherein the higher the usage frequency of the application icon is, the shorter the distance between the application icon and the application selection entry and the identity verification entry is.

7. The method according to claim 1, wherein the application selection instruction is an instruction generated after the electronic device detects that the application icon is continuously triggered by the external object for a preset period of time and detects that the external object triggers an identity verification entry.

8. The method according to claim 7, further comprising:
controlling, after detecting that the application icon is continuously triggered by the external object for the preset period of time, the display apparatus to display the triggered application icon at a position where the identity verification entry is located.

9. The method according to claim 7, wherein
after it is detected that a position of an application icon is triggered for a preset period of time, it indicates that the application icon is selected;
or,
when it is detected that a pressure received from a position where a application icon is located is greater than a preset pressure value, it indicates that the application icon is selected;
or,
when it is detected that a position of an application icon is triggered for a preset period of time and a received pressure is greater than a preset pressure value, it indicates that the application icon is selected.

10. The method according to claim 1, wherein the identity verification is performed in a following manner:

acquiring fingerprint information of the external object via a fingerprint collection entry; and performing the identity verification according to the fingerprint information.

11. The method according to claim 1, wherein the identity verification is performed in a following manner:

controlling the display apparatus to display identity verification information;

acquiring verification information provided in response to the identity verification information; and performing the identity verification according to the verification information.

12. The method according to claim 1, wherein before acquiring the application display instruction, wherein the application display instruction is the instruction generated in responsive to activation of the application selection entry by the external object, the method further comprises:

when receiving a screen wake-up instruction, entering, by the electronic device, a screen-locked state, and controlling, by the electronic device, the display apparatus of the electronic device to display the application selection entry in the screen-locked state.

13. The method according to claim 1, wherein the activation of the application selection entry by the external object comprises:

the activation of the application selection entry when the electronic device detects that the external object continuously triggers a position where the application selection entry is located for a preset period of time; or, the activation of the application selection entry when the electronic device receives a preset gesture of the external object.

14. The method according to claim 1, wherein the one or more application icons displayed by the display apparatus of the electronic device are determined according to historical usage records of application programs, or according to selection of the external object.

15. The method according to claim 1, wherein determining the usage frequency of the application program corresponding to each of the multiple application icons comprises:

calculating a usage time of the application program corresponding to each application icon within a preset period of time, and calculating a ratio of the usage time of the application program corresponding to each application icon to a sum of the usage time of application programs corresponding to all application icons to acquire the usage frequency of the application program corresponding to each application icon;

or, acquiring the number of times of using the application program corresponding to each application icon within a preset period of time, and calculating a ratio of the number of times of using the application program corresponding to each application icon to a sum of the number of times of using application programs corresponding to all the application icons, so as to acquire the usage frequency of the application program corresponding to each application icon.

16. The method according to claim 1, wherein when the electronic device adopts pattern unlocking, a starting point of a correct pattern corresponding to a pattern unlocking interface coincides with an end point of a trigger operation of the external object when the application selection instruction is generated.

17. An electronic device, wherein the electronic device comprises a processor and a memory, the memory stores at least one instruction, and the at least one instruction is loaded and executed by the processor to implement the following operations:

acquiring an application display instruction, wherein the application display instruction is an instruction generated in responsive to activation of an application selection entry by an external object;

controlling, according to the application display instruction, a display apparatus of an electronic device to display one or more application icons, wherein controlling, according to the application display instruction, the display apparatus of the electronic device to display the one or more application icons comprises: acquiring, according to the application display instruction, multiple application icons which are preset, and determining a usage frequency of an application program corresponding to each of the multiple application icons; determining an arrangement order of the multiple application icons according to the usage frequency; and controlling the display apparatus to display the multiple application icons according to the arrangement order, wherein before controlling the display apparatus to display the multiple application icons according to the arrangement order, the at least one instruction is loaded and executed by the processor to further implement the following operations: acquiring a preset default application icon, and controlling the display apparatus to display the default application icon on at least one of a position where the application selection entry is located and a position where an identity verification entry is located, wherein the default application icon is an application icon corresponding to an application program with highest usage frequency, or an application icon corresponding to an application program recently used by the external object, or an application icon set by an external object;

acquiring an application selection instruction, wherein the application selection instruction indicates that a corresponding application icon is selected; and in a case where identity verification is passed, executing an unlocking operation and starting an application program corresponding to the selected application icon.

18. A non-transitory computer-readable storage medium, storing at least one instruction, and the at least one instruction, when being loaded and executed by a processor, causes the processor to implement the following operations:

acquiring an application display instruction, wherein the application display instruction is an instruction generated in responsive to activation of an application selection entry by an external object;

controlling, according to the application display instruction, a display apparatus of an electronic device to display one or more application icons, wherein controlling, according to the application display instruction, the display apparatus of the electronic device to display the one or more application icons comprises: acquiring, according to the application display instruction, multiple application icons which are preset, and determining a usage frequency of an application program corresponding to each of the multiple application icons; determining an arrangement order of the multiple application icons according to the usage frequency; and controlling the display apparatus to display the multiple application icons according to the arrangement order, wherein before controlling the display apparatus to display the multiple application icons according to the arrangement order, the at least one instruction causes the processor to further implement the following operations: acquiring a preset default application icon, and controlling the display apparatus to display the default application icon on at least one of a position where the application selection entry is located and a position where an identity verification entry is located, wherein the default application icon is an application icon corresponding to an application program with highest usage frequency, or an application icon corresponding to an application program recently used by the external object, or an application icon set by an external object;

acquiring an application selection instruction, wherein the application selection instruction indicates that a corresponding application icon is selected; and in a case where identity verification is passed, executing an unlocking operation and starting an application program corresponding to the selected application icon.

\* \* \* \* \*